US011961455B2

(12) United States Patent
Park et al.

(10) Patent No.: US 11,961,455 B2
(45) Date of Patent: Apr. 16, 2024

(54) PIXEL CIRCUIT AND DISPLAY DEVICE HAVING THE SAME

(71) Applicant: Samsung Display Co., LTD., Yongin-si (KR)

(72) Inventors: Junhyun Park, Suwon-si (KR); Jangmi Kang, Seoul (KR); Hyeongseok Kim, Hwaseong-si (KR); Minjae Jeong, Hwaseong-si (KR); Mukyung Jeon, Ulsan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/066,977

(22) Filed: Dec. 15, 2022

(65) Prior Publication Data

US 2023/0252935 A1 Aug. 10, 2023

(30) Foreign Application Priority Data

Feb. 7, 2022 (KR) ........................ 10-2022-0015533

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2300/0426* (2013.01); *G09G 2300/0842* (2013.01); *G09G 2310/0275* (2013.01); *G09G 2330/12* (2013.01)

(58) Field of Classification Search
CPC .................................................... G09G 3/3233
See application file for complete search history.

(56) References Cited

U.S. PATENT DOCUMENTS

2009/0140959 A1* 6/2009 Nam ...................... G09G 3/325 345/76
2012/0293479 A1* 11/2012 Han ..................... H04N 13/341 345/212
2013/0106828 A1* 5/2013 Kim ..................... G09G 3/3233 345/82

FOREIGN PATENT DOCUMENTS

KR 10-0599726 B1 7/2006
KR 10-1706239 B1 2/2017
KR 10-1997792 B1 7/2019

* cited by examiner

*Primary Examiner* — Nan-Ying Yang
(74) *Attorney, Agent, or Firm* — Lewis Roca Rothgerber Christie LLP

(57) ABSTRACT

A pixel circuit includes: a light emitting element; a driving transistor to generate a driving current; a write transistor including a control electrode to receive a write gate signal, a first electrode to receive a data voltage, and a second electrode connected to a first electrode of a storage capacitor; a first compensation transistor including a control electrode to receive a compensation gate signal, a first electrode connected to a control electrode of the driving transistor, and a second electrode connected to a first electrode of the driving transistor; the storage capacitor including the first electrode connected to the second electrode of the write transistor, and a second electrode connected to the control electrode of the driving transistor; and a test transistor including a control electrode, a first electrode to receive the data voltage, and a second electrode connected to a second electrode of the driving transistor.

20 Claims, 14 Drawing Sheets

PIXEL CIRCUIT AND DISPLAY DEVICE HAVING THE SAME

CROSS-REFERENCE TO RELATED APPLICATION

This application claims priority to and the benefit of Korean Patent Application No. 10-2022-0015533, filed on Feb. 7, 2022, in the Korean Intellectual Property Office (KIPO), the entire content of which is incorporated by reference herein.

BACKGROUND

1. Field

Aspects of embodiments of the present disclosure relate to a pixel circuit including a light emitting element, and a display device including the pixel circuit.

2. Description of the Related Art

Generally, a display device may include a display panel and a display panel driver. The display panel driver may include a driving controller, a gate driver, and a data driver. The display panel may include a plurality of gate lines, a plurality of data lines, and a plurality of pixel circuits electrically connected to the gate lines and the data lines. The gate driver may provide gate signals to the gate lines. The data driver may provide data voltages to the data lines. The driving controller may control the gate driver and the data driver.

The pixel circuit may include a driving transistor for generating a driving current, and a light emitting element to which the driving current is applied. When the driving transistor of the pixel circuit does not operate properly, or when a wiring is cut or shorted, the driving current may not be properly applied to the light emitting element, so that the light emitting element may not emit light normally.

The above information disclosed in this Background section is for enhancement of understanding of the background of the present disclosure, and therefore, it may contain information that does not constitute prior art.

SUMMARY

In terms of manufacturing time and costs, it may be desirable to determine that the light emitting element operates normally (e.g., via an array test) before forming the light emitting element in the pixel circuit, and to repair a wiring and/or a driving transistor of the pixel circuit when a problem occurs.

One or more embodiments of the present disclosure are directed to a pixel circuit including a test transistor for performing an array test.

One or more embodiments of the present disclosure are directed to a display device including the pixel circuit.

According to one or more embodiments of the present disclosure, a pixel circuit includes: a light emitting element; a driving transistor configured to generate a driving current; a write transistor including a control electrode configured to receive a write gate signal, a first electrode configured to receive a data voltage, and a second electrode connected to a first electrode of a storage capacitor; a first compensation transistor including a control electrode configured to receive a compensation gate signal, a first electrode connected to a control electrode of the driving transistor, and a second electrode connected to a first electrode of the driving transistor; the storage capacitor including the first electrode connected to the second electrode of the write transistor, and a second electrode connected to the control electrode of the driving transistor; and a test transistor including a control electrode, a first electrode configured to receive the data voltage, and a second electrode connected to a second electrode of the driving transistor.

In an embodiment, the test transistor may be configured to be in an on-state with the first compensation transistor in an array test period, and not be in the on-state with the first compensation transistor in a driving period.

In an embodiment, the first electrode of the test transistor may be connected to a data line configured to be applied with the data voltage.

In an embodiment, the control electrode of the test transistor may be configured to receive the write gate signal.

In an embodiment, the pixel circuit may further include: a second compensation transistor including a control electrode configured to receive the compensation gate signal, a first electrode, and a second electrode connected to the first electrode of the storage capacitor. The first electrode of the second compensation transistor may be configured to be in a floating state in an array test period, and the first electrode of the second compensation transistor may be configured to receive a reference voltage in a driving period.

In an embodiment, the pixel circuit may further include: a second compensation transistor including a control electrode configured to receive the compensation gate signal, a first electrode, and a second electrode connected to the first electrode of the storage capacitor. The first electrode of the second compensation transistor may be configured to receive the data voltage in an array test period, and the first electrode of the second compensation transistor may be configured to receive a reference voltage in a driving period.

In an embodiment, the control electrode of the test transistor may be configured to receive a first test signal, the first test signal may have the same voltage level as that of the write gate signal in an array test period, and the first test signal may have an inactive level in a driving period.

In an embodiment, the pixel circuit may further include: a first initialization transistor including a control electrode configured to receive an initialization gate signal, a first electrode configured to receive a first initialization voltage, and a second electrode connected to the control electrode of the driving transistor; a second compensation transistor including a control electrode configured to receive the compensation gate signal, a first electrode, and a second electrode connected to the first electrode of the storage capacitor; a second initialization transistor including a control electrode configured to receive a bias signal, a first electrode configured to receive a second initialization voltage, and a second electrode connected to an anode electrode of the light emitting element; a first emission transistor including a control electrode configured to receive a first emission signal, a first electrode connected to the second electrode of the driving transistor, and a second electrode configured to receive a first power voltage; a second emission transistor including a control electrode configured to receive a second emission signal, a first electrode connected to the anode electrode of the light emitting element, and a second electrode connected to the first electrode of the driving transistor; and a hold capacitor including a first electrode connected to the first electrode of the storage capacitor, and a second electrode configured to receive the first power voltage.

In an embodiment, the pixel circuit may further include: a bias transistor including a control electrode configured to receive the bias signal, a first electrode connected to the second electrode of the driving transistor, and a second electrode configured to receive a bias voltage.

In an embodiment, the bias signal may have an inactive level in an array test period.

In an embodiment, the first electrode of the test transistor may be connected to the second electrode of the write transistor.

In an embodiment, the control electrode of the test transistor may be configured to receive the compensation gate signal.

In an embodiment, the pixel circuit may further include: a first initialization transistor including a control electrode configured to receive an initialization gate signal, a first electrode configured to receive a first initialization voltage, and a second electrode connected to the control electrode of the driving transistor; a second initialization transistor including a control electrode configured to receive a bias signal, a first electrode configured to receive a second initialization voltage, and a second electrode connected to an anode electrode of the light emitting element; a first emission transistor including a control electrode configured to receive a first emission signal, a first electrode connected to the second electrode of the driving transistor, and a second electrode configured to receive a first power voltage; a second emission transistor including a control electrode configured to receive a second emission signal, a first electrode connected to the anode electrode of the light emitting element, and a second electrode connected to the first electrode of the driving transistor; a hold capacitor including a first electrode connected to the first electrode of the storage capacitor, and a second electrode configured to receive the first power voltage; and a bias transistor including a control electrode configured to receive the bias signal, a first electrode connected to the second electrode of the driving transistor, and a second electrode configured to receive a bias voltage.

In an embodiment, the control electrode of the test transistor may be configured to receive a second test signal, the second test signal may have the same voltage level as that of the compensation gate signal in an array test period, and the second test signal may have an inactive level in a driving period.

According to one or more embodiments of the present disclosure, a display device includes: a display panel including pixel circuits; and a display panel driver configured to drive the display panel. Each of the pixel circuits includes: a light emitting element; a driving transistor configured to generate a driving current; a write transistor including a control electrode configured to receive a write gate signal, a first electrode configured to receive a data voltage, and a second electrode connected to a first electrode of a storage capacitor; a first compensation transistor including a control electrode configured to receive a compensation gate signal, a first electrode connected to a control electrode of the driving transistor, and a second electrode connected to a first electrode of the driving transistor; the storage capacitor including the first electrode connected to the second electrode of the write transistor, and a second electrode connected to the control electrode of the driving transistor; a test transistor including a control electrode, a first electrode configured to receive the data voltage, and a second electrode connected to a second electrode of the driving transistor; and a hold capacitor including a first electrode connected to the first electrode of the storage capacitor, and a second electrode configured to receive a first power voltage.

In an embodiment, the test transistor may be configured to be in an on-state with the first compensation transistor in an array test period, and not be in the on-state with the first compensation transistor in a driving period.

In an embodiment, the first electrode of the test transistor may be connected to a data line configured to be applied with the data voltage.

In an embodiment, the control electrode of the test transistor may be configured to receive the write gate signal.

In an embodiment, the first electrode of the test transistor may be connected to the second electrode of the write transistor.

In an embodiment, the control electrode of the test transistor may be configured to receive the compensation gate signal.

According to one or more embodiments of the present disclosure, the pixel circuit may form a current path flowing through a driving transistor and a test transistor to which the data voltage is applied, and thus, an array test for the driving transistor may be performed. For example, the pixel circuit may include: a light emitting element; the driving transistor configured to generate a driving current; a write transistor including a control electrode configured to receive a write gate signal, a first electrode configured to receive a data voltage, and a second electrode connected to a first electrode of a storage capacitor; a first compensation transistor including a control electrode configured to receive a compensation gate signal, a first electrode connected to a control electrode of the driving transistor, and a second electrode connected to a first electrode of the driving transistor; the storage capacitor including the first electrode connected to the second electrode of the write transistor, and a second electrode connected to the control electrode of the driving transistor; and the test transistor including a control electrode, a first electrode configured to receive the data voltage, and a second electrode connected to a second electrode of the driving transistor, such that the array test for the driving transistor may be performed.

In addition, according to one or more embodiments of the present disclosure, the display device may perform an array test and high-speed driving of a driving transistor. For example, the display device may include: a first compensation transistor including a control electrode configured to receive a compensation gate signal, a first electrode connected to a control electrode of the driving transistor, and a second electrode connected to a first electrode of the driving transistor; a storage capacitor including the first electrode connected to the second electrode of the write transistor, and a second electrode connected to the control electrode of the driving transistor; a test transistor including a control electrode, a first electrode configured to receive the data voltage, and a second electrode connected to a second electrode of the driving transistor; and a hold capacitor including a first electrode connected to the first electrode of the storage capacitor, and a second electrode configured to receive a first power voltage, such that the array test and high-speed driving of the driving transistor may be performed.

However, the aspects and features of the present disclosure are not limited to those described above, and may be variously expanded without departing from the spirit and scope of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
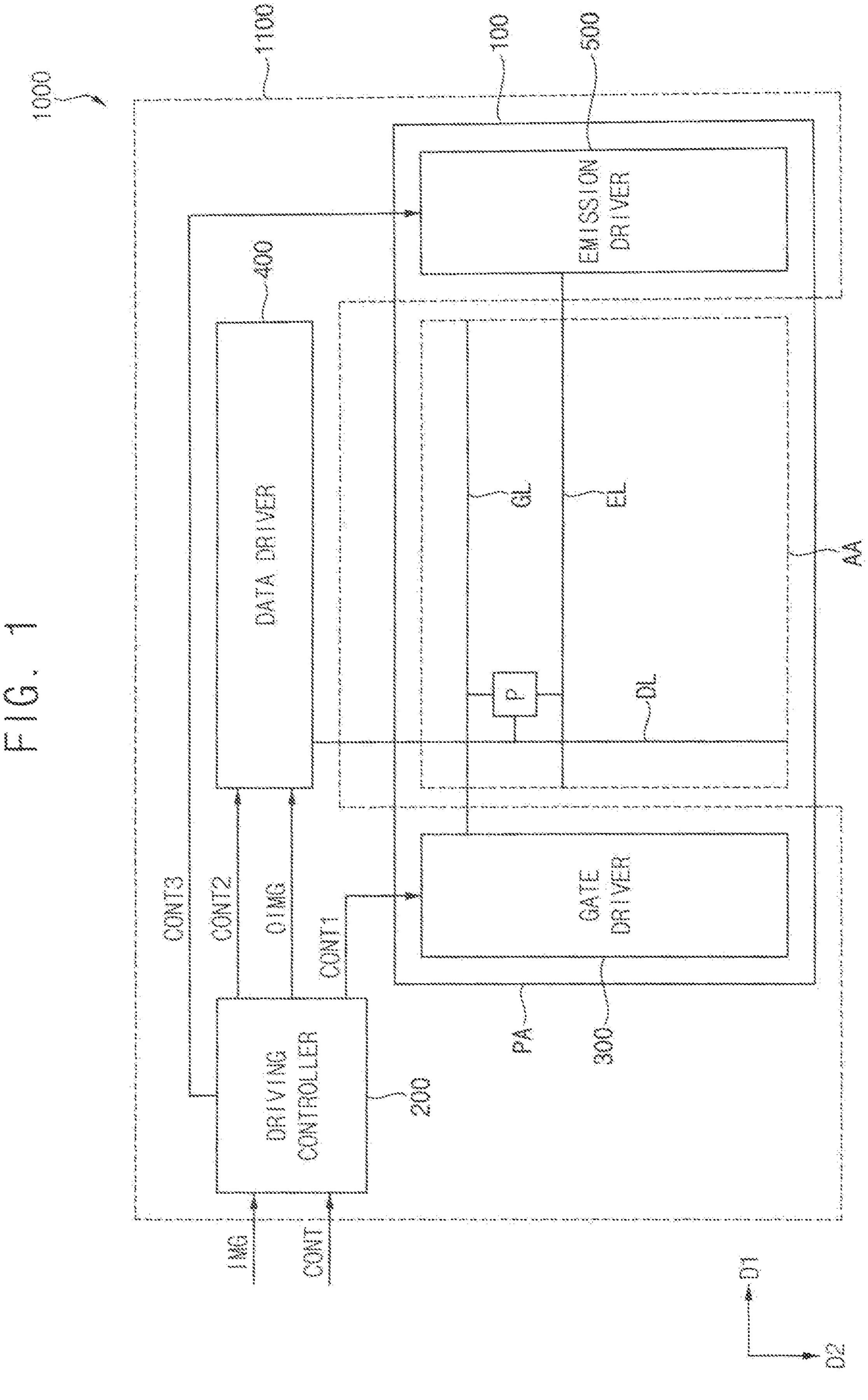
FIG. 1 is a block diagram illustrating a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

In the claims, means-plus-function clauses, if any, are intended to cover the structures described in the present specification as performing the recited functions, and include not only structural equivalents but also equivalent structures.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device 1000 according to one or more embodiments of the present disclosure.

Referring to FIG. 1, the display device 1000 may include a display panel 100 and a display panel driver 1100. The display panel driver 1100 may include a driving controller 200, a gate driver 300, a data driver 400, and an emission driver 500. In an embodiment, the driving controller 200 and the data driver 400 may be integrated into the same chip (e.g., into one chip).

The display panel 100 has a display region AA at (e.g., in or on) which an image is displayed, and a peripheral region PA adjacent to the display region AA. In an embodiment, the gate driver 300 may be mounted at (e.g., in or on) the peripheral region PA of the display panel 100.

The display panel 100 may include a plurality of gate lines GL, a plurality of data lines DL, and a plurality of pixel circuits P electrically connected to the data lines DL and the gate lines GL. The gate lines GL may extend in a first direction D1, and the data lines DL may extend in a second direction D2 crossing the first direction D1.

The driving controller 200 may receive input image data IMG and an input control signal CONT from a host processor (e.g., a graphic processing unit; GPU). For example, the input image data IMG may include red image data, green image data, and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and output image data OIMG, based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT, and may output the second control signal CONT2 to the data driver 400. The second control signal CONT2 may include a horizontal start signal and a load signal.

The driving controller 200 may receive the input image data IMG and the input control signal CONT, and may generate the output image data OIMG. The driving controller 200 may output the output image data OIMG to the data driver 400.

The gate driver 300 may generate gate signals for driving the gate lines GL, in response to the first control signal CONT1 input from the driving controller 200. The gate driver 300 may output the gate signals to the gate lines GL. For example, the gate driver 300 may sequentially output the gate signals to the gate lines GL. For example, the gate signals may include a write gate signal GW, a compensation gate signal GC, a initialization gate signal GI, and a bias signal EB (e.g., see FIG. 2). For example, the gate signals may include a first test signal TS1 (e.g., see FIG. 7) and a second test signal TS2 (e.g., see FIG. 15).

The data driver 400 may receive the second control signal CONT2 and the output image data OIMG from the driving controller 200. The data driver 400 may convert the output image data OIMG into data voltages having an analog type. The data driver 400 may output the data voltages to the data lines DL.

The driving controller 200 may generate the third control signal CONT3 for controlling an operation of the emission driver 500 based on the input control signal CONT, and may output the third control signal CONT3 to the emission driver 500. The emission driver 500 may generate emission signals for driving emission lines EL, in response to the third control signal CONT3 input from the driving controller 200. The emission driver 500 may output emission signals to the emission lines EL. For example, the emission driver 500 may sequentially output the emission signals to the emission lines EL. For example, the emission signals may include a first emission signal EM1 and a second emission signal EM2 (e.g., see FIG. 2).

In an embodiment, the display device 1000 of FIG. 1 may support a normal mode, in which the display panel 100 is driven at a fixed frame frequency (e.g., about 60 Hz, about 120 Hz, or about 240 Hz), as well as a variable frequency mode, in which the display panel 100 is driven at a variable frame frequency. For example, the variable frame frequency may have a range of about 1 Hz to about 120 Hz, about 1 Hz to about 240 Hz, and/or the like, but is not limited thereto.

Figure 2:
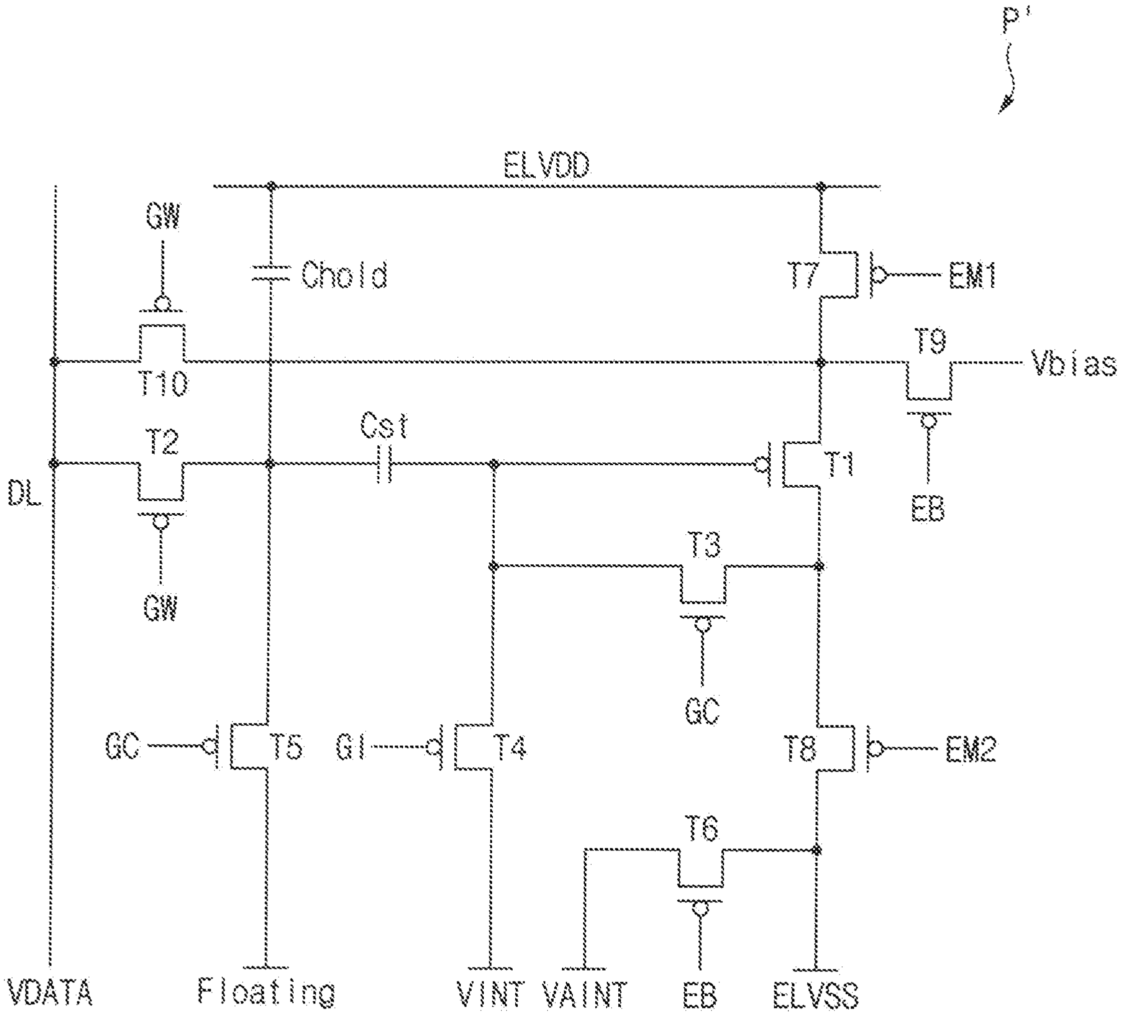
FIG. 2 is a circuit diagram illustrating an example of a pixel circuit before a light emitting element of the display device of FIG. 1 is formed.
Figure 3:
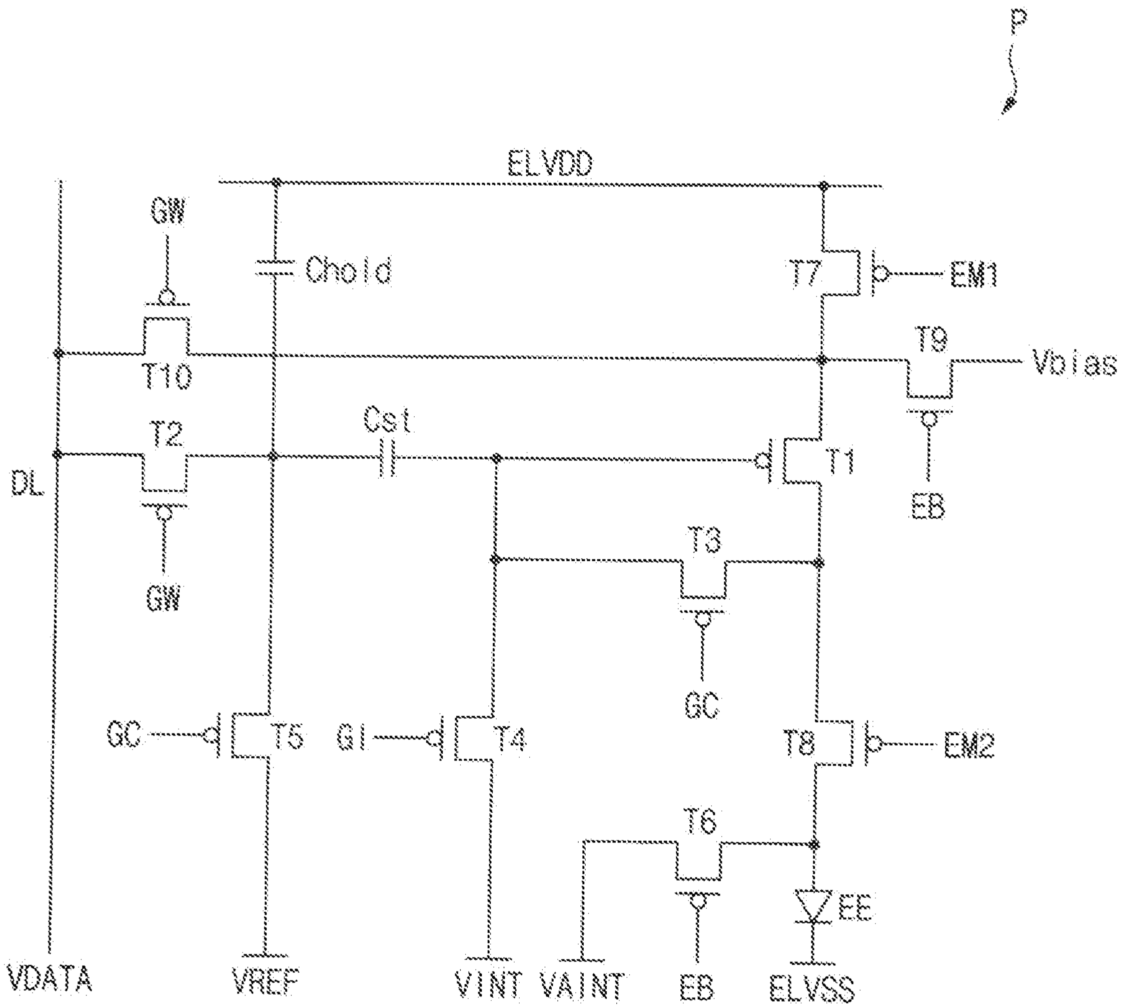
FIG. 3 is a circuit diagram illustrating an example of a pixel circuit of the display device of FIG. 1.
Figure 4:
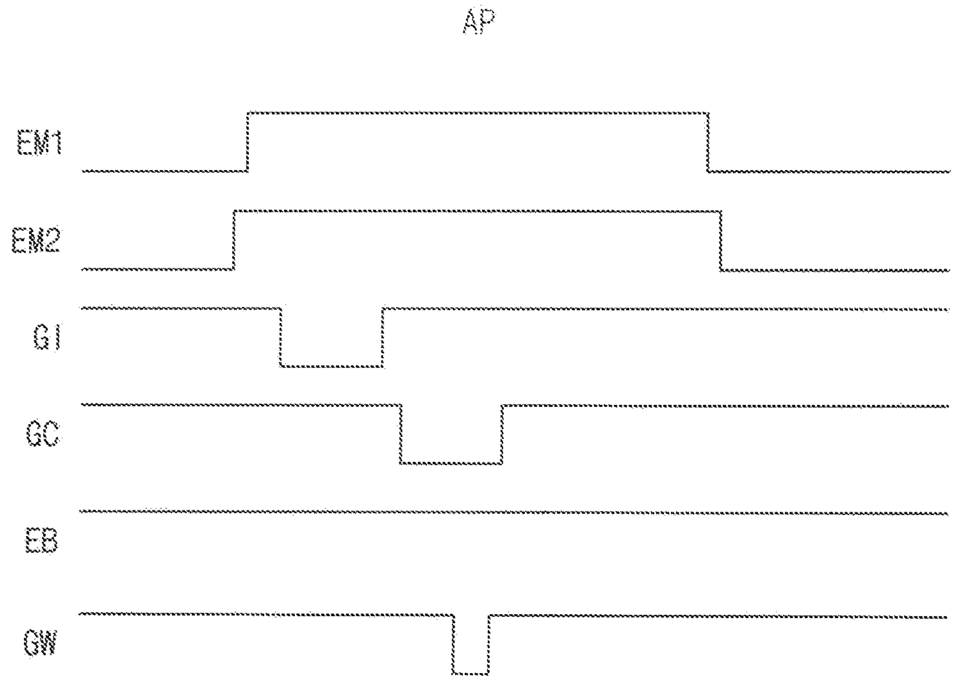
FIG. 4 is a timing diagram illustrating an example of signals in an array test period of the display device of FIG. 1.
Figure 5:
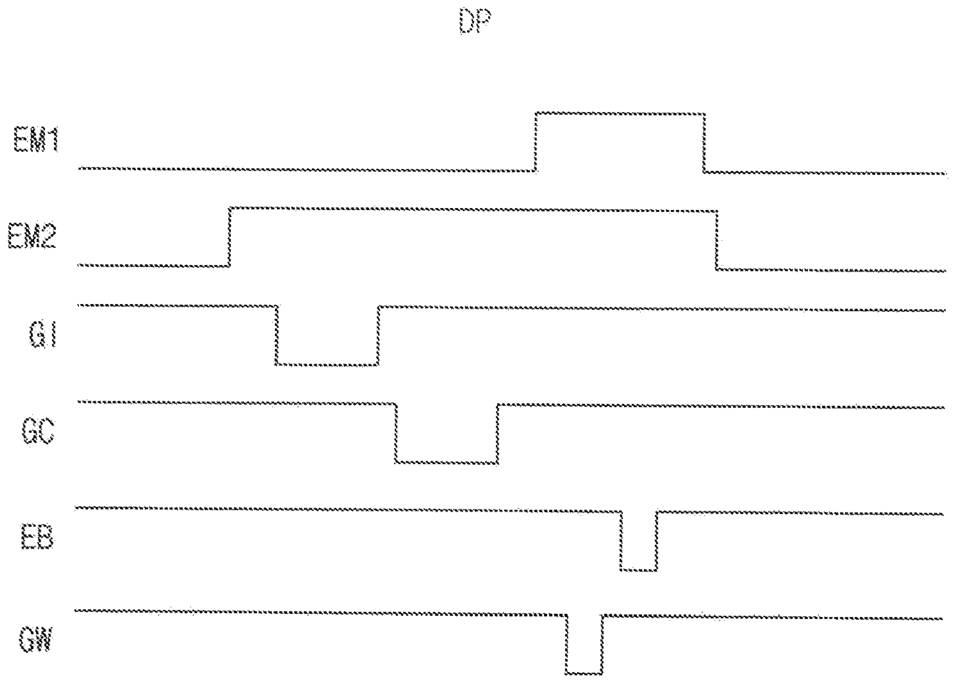
FIG. 5 is a timing diagram illustrating an example of signals in a driving period of the display device of FIG. 1.

FIG. 2 is a circuit diagram illustrating an example of the pixel circuit P' before a light emitting element EE of the display device 1000 of FIG. 1 is formed. FIG. 3 is a circuit diagram illustrating an example of the pixel circuit P of the display device 1000 of FIG. 1. FIG. 4 is a timing diagram illustrating an example of signals in an array test period AP of the display device 1000 of FIG. 1. FIG. 5 is a timing diagram illustrating an example of signals in a driving period DP of the display device 1000 of FIG. 1. For convenience of illustration, FIGS. 4 and 5 illustrate an active level as a low voltage level, and an inactive level as a high voltage level.

Referring to FIGS. 1 to 5, the pixel circuit P may include a light emitting element EE, a driving transistor T1 for generating a driving current, a write transistor T2, a first compensation transistor T3, a storage capacitor Cst, and a test transistor T10. The write transistor T2 may include a control electrode for receiving the write gate signal GW, a first electrode for receiving the data voltage VDATA, and a second electrode connected to a first electrode of the storage capacitor Cst. The first compensation transistor T3 may include a control electrode for receiving the compensation gate signal GC, a first electrode connected to a control electrode of the driving transistor T1, and a second electrode connected to a first electrode of the driving transistor T1. The storage capacitor Cst may include the first electrode connected to the second electrode of the write transistor T2, and a second electrode connected to the control electrode of the driving transistor T1. The test transistor T10 may include a control electrode, a first electrode for receiving the data voltage VDATA, and a second electrode connected to a second electrode of the driving transistor T1.

In an embodiment, the pixel circuit P may further include a first initialization transistor T4, a second compensation transistor T5, a second initialization transistor T6, a first emission transistor T7, a second emission transistor T8, and a hold capacitor Chold. The first initialization transistor T4 may include a control electrode for receiving the initialization gate signal GI, a first electrode for receiving a first initialization voltage VINT, and a second electrode connected to the control electrode of the driving transistor T1. The second compensation transistor T5 may include a control electrode for receiving the compensation gate signal GC, a first electrode, and a second electrode connected to the first electrode of the storage capacitor Cst. The second initialization transistor T6 may include a control electrode for receiving the bias signal EB, a first electrode for receiving a second initialization voltage VAINT, and a second electrode connected to an anode electrode of the light emitting element EE. The first emission transistor T7 may include a control electrode for receiving the first emission signal EM1, a first electrode connected to the second electrode of the driving transistor T1, and a second electrode for receiving a first power voltage ELVDD (e.g., a high power voltage). The second emission transistor T8 may include a control electrode for receiving the second emission signal EM2, a first electrode connected to the anode electrode of the light emitting element EE, and a second electrode connected to the first electrode of the driving transistor T1. The hold capacitor Chold may include a first electrode connected to the first electrode of the storage capacitor Cst, and a second electrode for receiving the first power voltage ELVDD.

In an embodiment, the pixel circuit P may further include a bias transistor T9 including a control electrode for receiving the bias signal EB, a first electrode connected to the second electrode of the driving transistor T1, and a second electrode for receiving a bias voltage Vbias. The light emitting element EE may include the anode electrode connected to the first electrode of the second emission transistor T8, and a cathode electrode for receiving the second power voltage ELVSS (e.g., a low power voltage). As shown in FIGS. 2 and 3, the transistors (e.g., T1 through T10) may be implemented as PMOS transistors, but the present disclosure is not limited thereto.

In an embodiment, the first electrode of the test transistor T10 may be connected to the data line DL to which the data voltage VDATA is applied. The write gate signal GW may be applied to the control electrode of the test transistor T10.

An array test may be performed to check whether the driving transistor T1 operates normally, and whether or not a wiring is cut or shorted. In order to perform the array test on the driving transistor T1, a current path flowing from the data line DL to the driving transistor T1 is used. Because the pixel circuit P includes the test transistor T10, the current path flowing from the data line DL to the driving transistor T1 may be formed.

In an embodiment, the test transistor T10 may be in an on-state (e.g, the on-state occurs when a signal having the active level is applied to the control electrode of a transistor) with the first compensation transistor T3 in the array test period AP, and may not be in the on-state with the first compensation transistor T3 in the driving period DP. The first electrode of the second compensation transistor T5 may be in a floating state in the array test period AP, and a reference voltage VREF may be applied to the first electrode of the second compensation transistor T5 in the driving period DP.

For example, as shown in FIG. 4, as the initialization gate signal GI has an active level in the array test period AP, the first initialization voltage VINT may be applied to the control electrode of the driving transistor T1. As the compensation gate signal GC and the write gate signal GW concurrently (e.g., simultaneously) have the active level, and the first emission signal EM1 has the inactive level in the array test period AP, the current path flowing from the data line DL through the test transistor T10, the driving transistor T1, and the first compensation transistor T3 to the control electrode of the driving transistor T1 may be formed. Accordingly, the array test for the driving transistor T1 may be performed. In this case, by designing the first electrode of the second compensation transistor T5 to be in the floating state, crosstalk by a line to which the reference voltage VREF is applied may be prevented or substantially prevented. The above description has been given according to a sequence of the timing diagram shown in FIG. 4.

In another embodiment, as the write gate signal GW and the bias signal EB concurrently (e.g., simultaneously) may have the active level, and the compensation gate signal GC may have the inactive level in the array test period AP, the current path flowing from the data line DL through the test transistor T10, the driving transistor T1, the second emission transistor T8, and the second initialization transistor T6 to the first electrode of the second initialization transistor T6 may be formed.

In an embodiment, as shown in FIG. 5, as the initialization gate signal GI has the active level in the driving period DP for the display device 1000 to display an image, the first initialization voltage VINT may be applied to the control electrode of the driving transistor T1. As the compensation gate signal GC and the first emission signal EM1 have the active level in the driving period DP, the reference voltage VREF may be applied to the first electrode of the storage capacitor Cst, and the first power voltage ELVDD for which a threshold voltage of the driving transistor T1 is compensated for may be applied to the second electrode of the storage capacitor Cst (e.g., a voltage of the second electrode of the storage capacitor Cst may be ELVDD-VTH, where VTH is the threshold voltage of the driving transistor T1). As the write gate signal GW has the active level in the driving period DP, the data voltage VDATA may be applied to the first electrode of the storage capacitor Cst. Also, because the second electrode of the storage capacitor Cst is in the floating state, the voltage of the second electrode of the storage capacitor Cst may change by a difference between the data voltage VDATA and the reference voltage VREF (e.g., the voltage of the second electrode of the storage capacitor Cst may be ELVDD-VTH+VDATA-VREF.). As the bias signal EB has the active level in the driving period DP, the bias voltage Vbias may be applied to the second electrode of the driving transistor T1, and the second initialization voltage VAINT may be applied to the anode electrode of the light emitting element EE. Accordingly, a hysteresis characteristic of the driving transistor T1 may be restored, and the anode electrode of the light emitting element EE may be initialized. As the first emission signal EM1 and the second emission signal EM2 have the active level in the driving period DP, the first power voltage ELVDD may be applied to the second electrode of the driving transistor T1. Accordingly, the driving current proportional to a square of a source-gate voltage (e.g., VREF-VDATA) of the driving transistor T1 may be generated. The above description has been given according to a sequence of the timing diagram shown in FIG. 5.

As shown in FIG. 5, by performing a threshold voltage compensation operation (e.g., an operation of applying the first power voltage ELVDD for which the threshold voltage is compensated to the storage capacitor Cst) and a data write operation (e.g., an operation of applying the data voltage VDATA to the first electrode of the storage capacitor Cst) separately, an operation time of the threshold voltage compensation operation may be sufficiently secured, and an operation time of the data write operation may be reduced. Accordingly, the display device 1000 may perform high-speed driving (e.g., because the operation time of the data write operation for compensating the threshold voltage may not be increased.).

Figure 6:
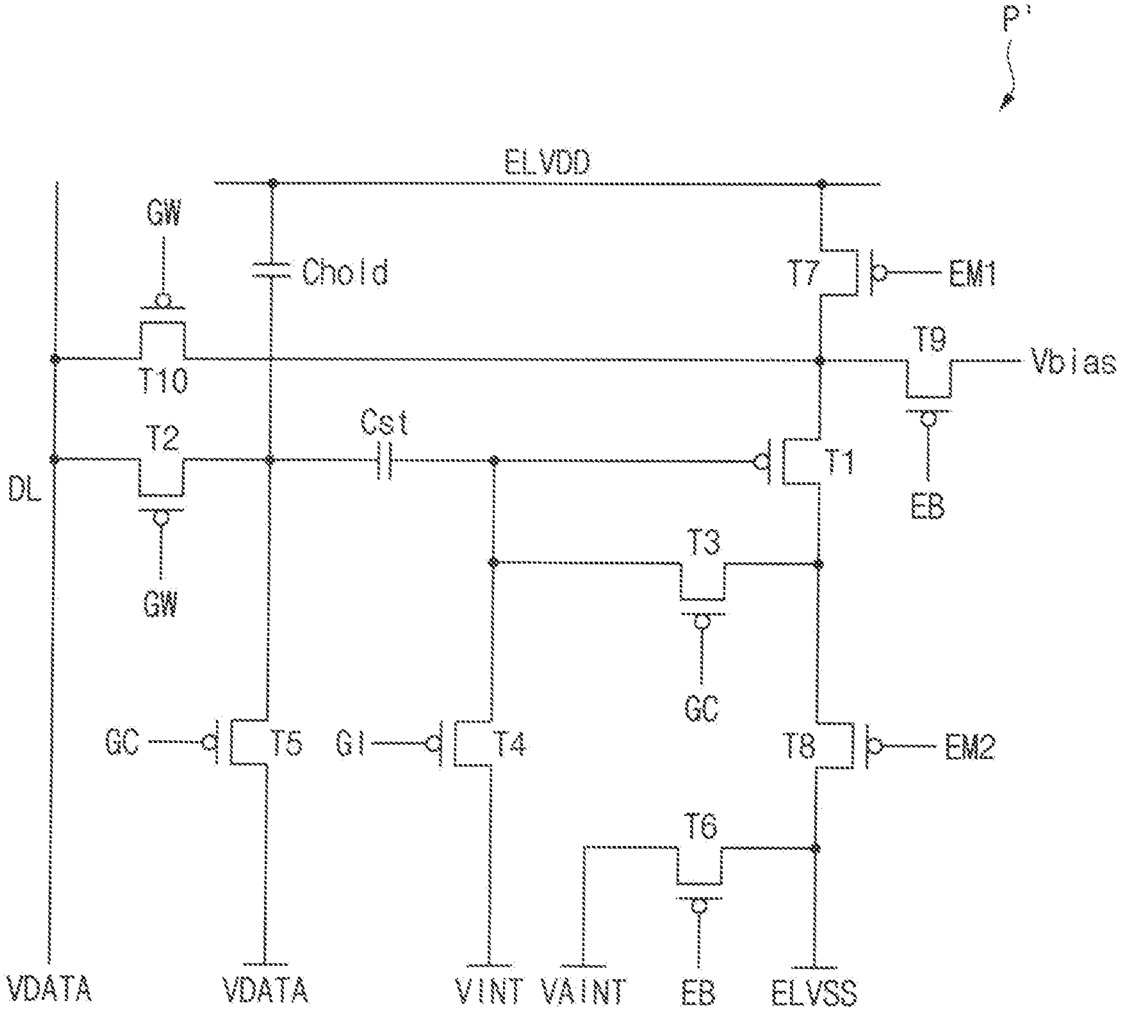
FIG. 6 is a circuit diagram illustrating a pixel circuit before a light emitting element is formed according to one or more embodiments of the present disclosure.

FIG. 6 is a circuit diagram illustrating a pixel circuit P' before the light emitting element EE is formed according to one or more embodiments of the present disclosure.

The display device according to the present embodiment may be the same or substantially the same as the display device 1000 of FIG. 1, except for a voltage applied to the first electrode of the second compensation transistor T5 may be different. Therefore, the same reference numerals are used to refer to the same or substantially the same (or similar) elements as those described above, and thus, redundant description thereof may not be repeated.

Referring to FIGS. 1, and 4 through 6, the data voltage VDATA may be applied to the first electrode of the second compensation transistor T5 in the array test period AP, and the reference voltage VREF may be applied to the first electrode of the second compensation transistor T5 in the driving period DP.

For example, as the compensation gate signal GC and the write gate signal GW concurrently (e.g., simultaneously) have the active level in the array test period AP, the current path flowing from the data line DL through the test transistor T10, the driving transistor T1, and the first compensation transistor T3 to the control electrode of the driving transistor T1 may be formed. Accordingly, the array test for the driving transistor T1 may be performed. In this case, by designing the data voltage VDATA to be applied to the first electrode of the second compensation transistor T5, a current flowing to the first electrode of the storage capacitor Cst through the write transistor T2 may be prevented or substantially prevented.

Figure 7:
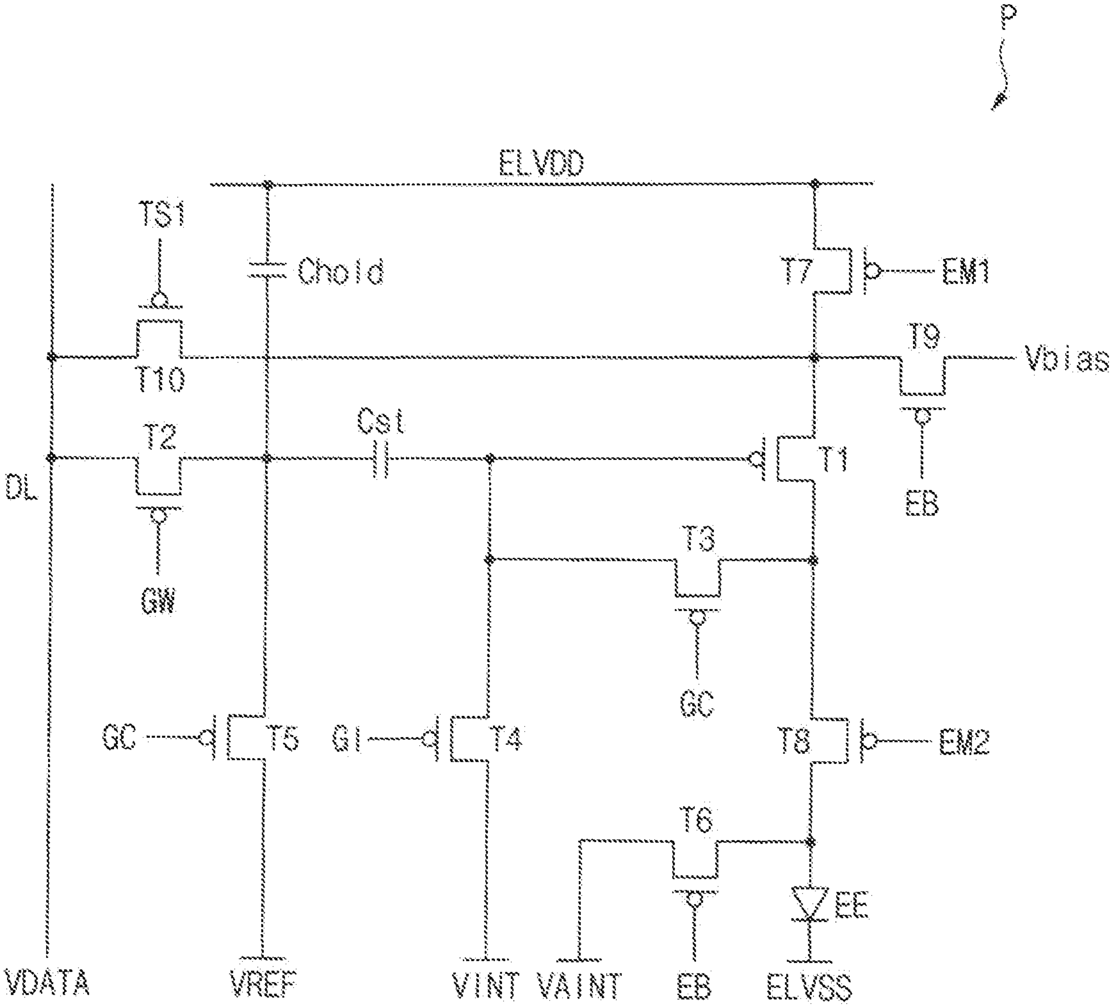
FIG. 7 is a circuit diagram illustrating a pixel circuit of a display device according to one or more embodiments of the present disclosure.
Figure 8:
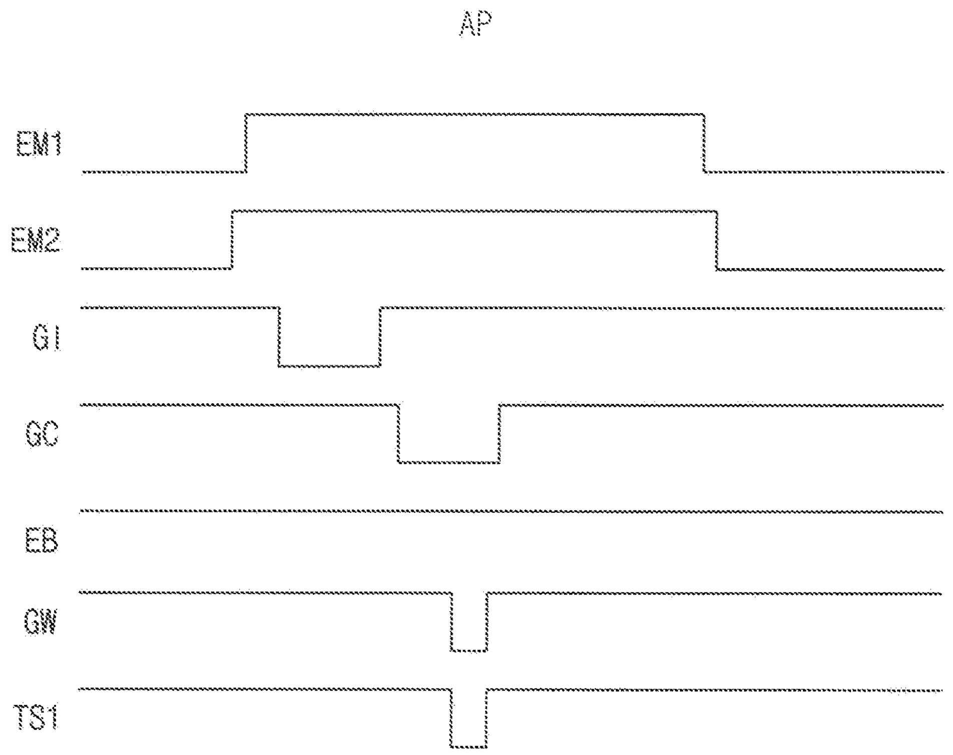
FIG. 8 is a timing diagram illustrating an example of signals in an array test period of the display device of FIG. 7.
Figure 9:
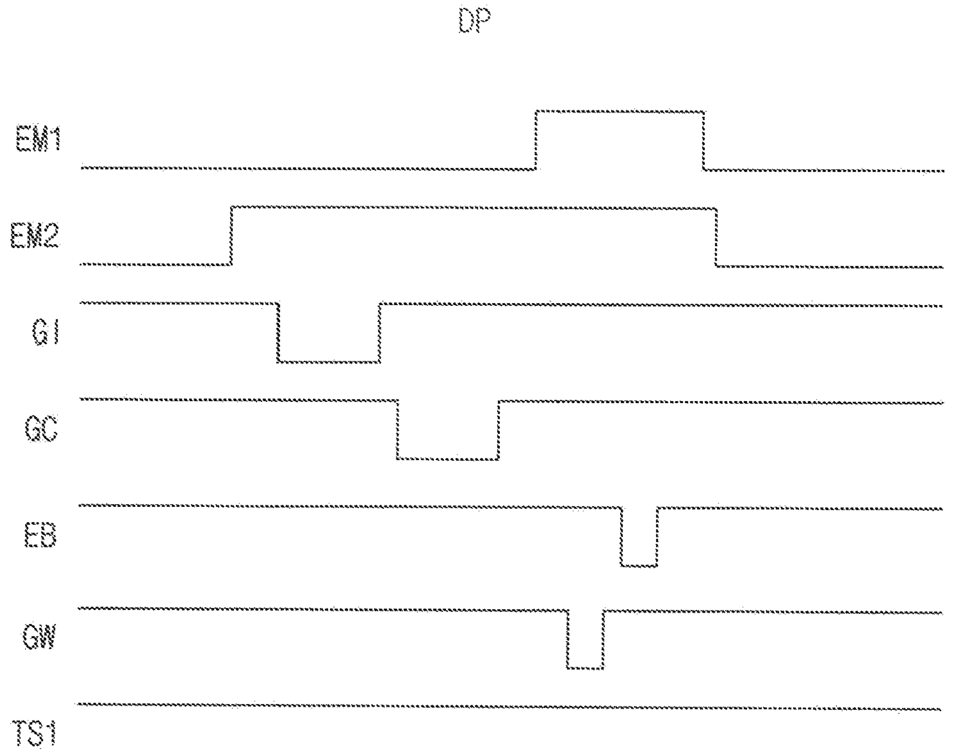
FIG. 9 is a timing diagram illustrating an example of signals in a driving period of the display device of FIG. 7.

FIG. 7 is a circuit diagram illustrating the pixel circuit P of a display device according to one or more embodiments of the present disclosure. FIG. 8 is a timing diagram illustrating an example of signals in the array test period AP of the display device of FIG. 7. FIG. 9 is a timing diagram illustrating an example of signals in the driving period DP of the display device of FIG. 7. FIGS. 8 and 9 illustrate the active level as the low voltage level and the inactive level as the high voltage level.

The display device according to the present embodiment may be the same or substantially the same as (or similar to) the display device 1000 of FIG. 1, except for a voltage applied to the first electrode of the test transistor T10 may be different. Therefore, the same reference numerals are used to refer to the same or substantially the same (or similar) elements, and thus, redundant description thereof may not be repeated.

Referring to FIGS. 1 and 7 through 9, a first test signal TS1 may be applied to the control electrode of the test transistor T10 in the array test period AP, and the first test signal TS1 may have the inactive level in the driving period DP. In an embodiment, the first test signal TS1 may have the same or substantially the same voltage level as that of the write gate signal GW in the array test period AP. Accordingly, the display device of FIG. 7 may perform the array test in the same or substantially the same manner as that of the display device 1000 of FIG. 1 in the array test period AP. However, unlike the display device 1000 of FIG. 1, the display device of FIG. 7 may not apply the data voltage VDATA to the second electrode of the driving transistor T1 through the test transistor T10 in the driving period DP.

Figure 10:
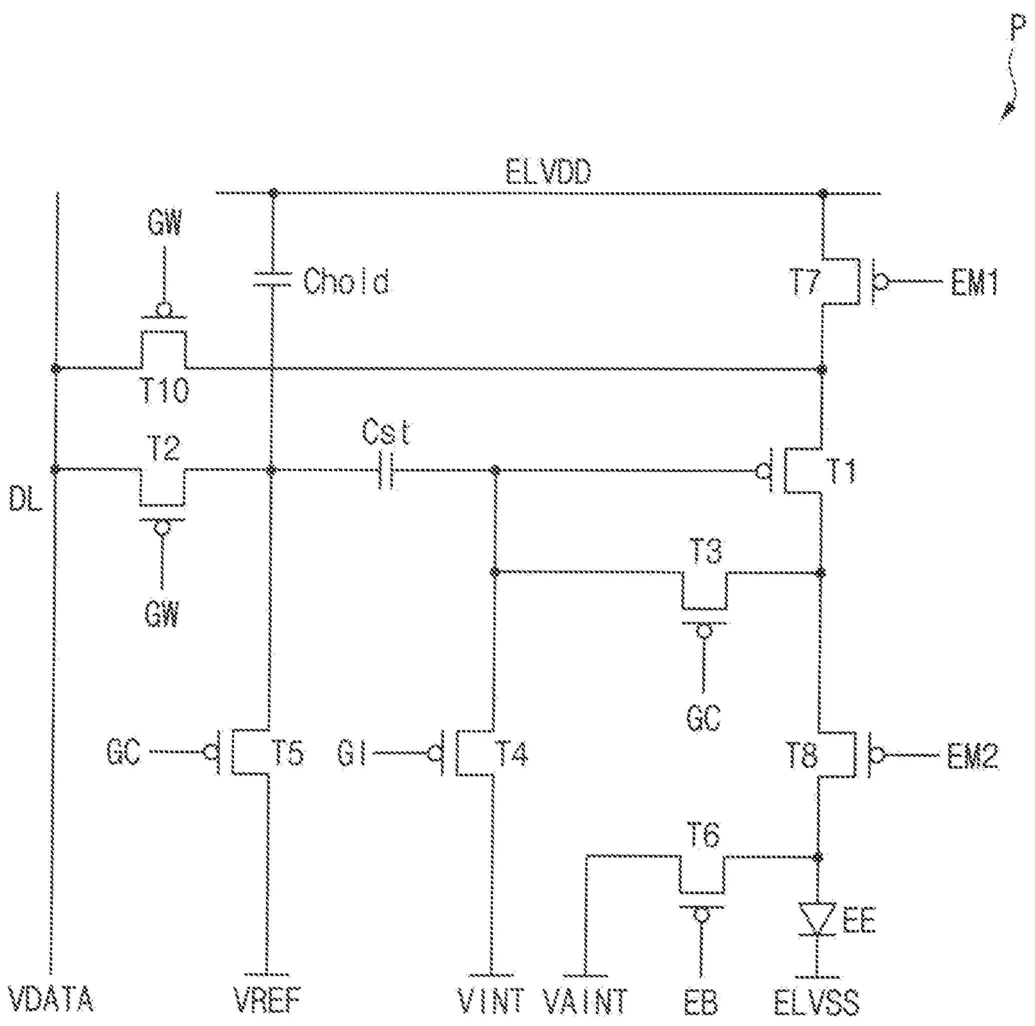
FIG. 10 is a circuit diagram illustrating an example of a pixel circuit of a display device according to one or more embodiments of the present disclosure.

FIG. 10 is a circuit diagram illustrating an example of the pixel circuit P of a display device according to one or more embodiments of the present disclosure.

The display device according to the present embodiment may be the same or substantially the same as the display device 1000 of FIG. 1, except for the bias transistor T9 may be omitted. Therefore, the same reference numerals are used to refer to the same or substantially the same (or similar) elements as those discussed above, and redundant description thereof may not be repeated.

Referring to FIGS. 5 and 10, as the write gate signal GW has the active level in the driving period DP, the data voltage VDATA may be applied to the second electrode of the driving transistor T1. The hysteresis characteristic of the driving transistor T1 may be restored by applying the data voltage VDATA that is lower than the first power supply voltage ELVDD, which is the high power voltage. Unlike the display device 1000 of FIG. 1, the display device of FIG. 10 may restore the hysteresis characteristic of the driving transistor T1 through the test transistor T10.

Figure 11:
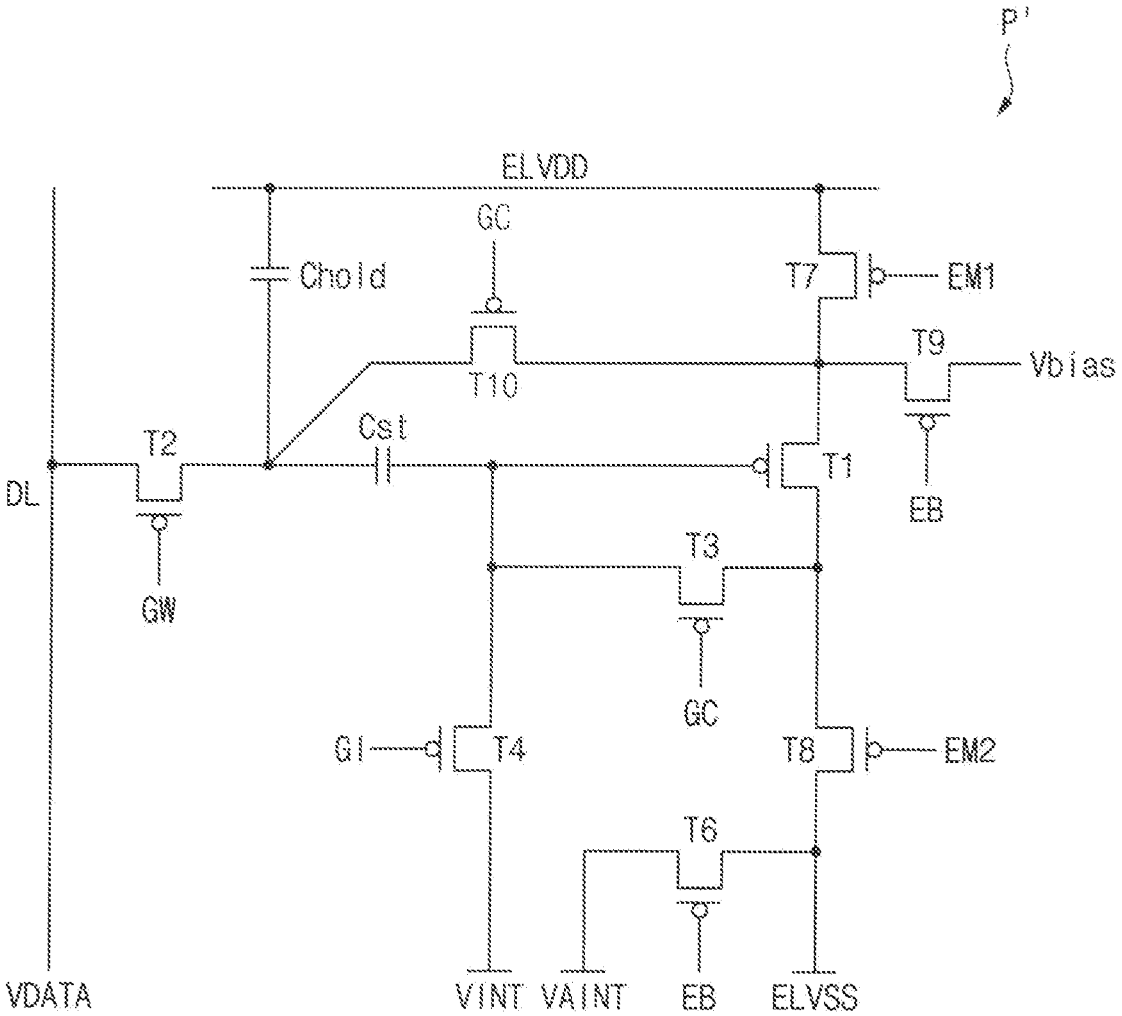
FIG. 11 is a circuit diagram illustrating an example of a pixel circuit before a light emitting element of a display device according to one or more embodiments of the present disclosure is formed.
Figure 12:
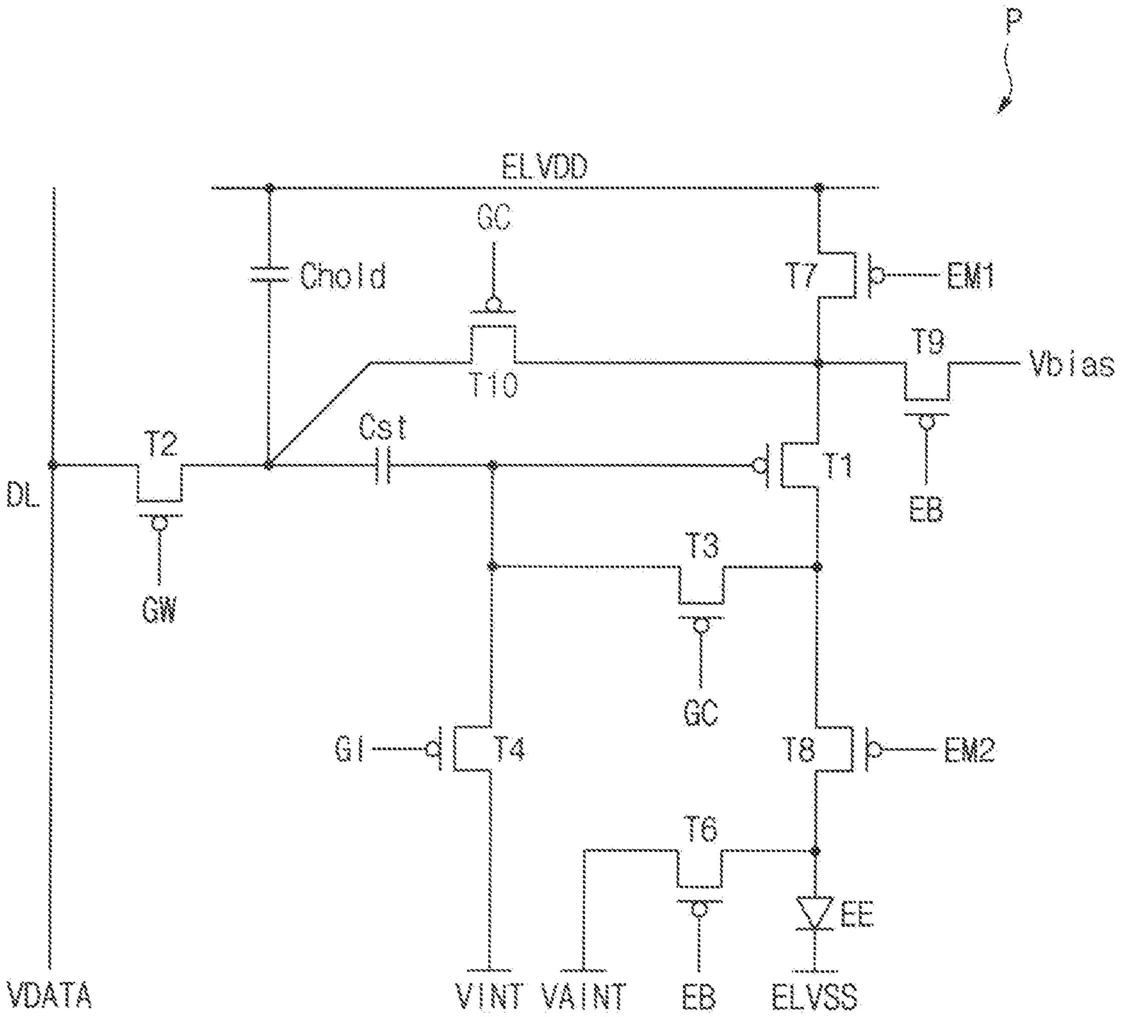
FIG. 12 is a circuit diagram illustrating an example of a pixel circuit of the display device of FIG. 11.
Figure 13:
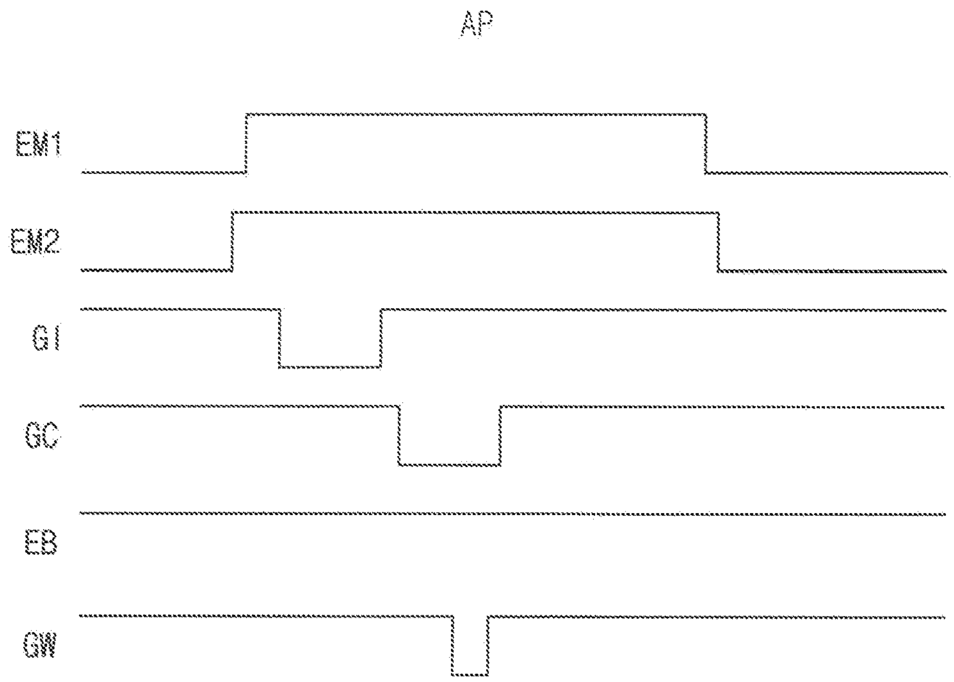
FIG. 13 is a timing diagram illustrating an example of signals in an array test period of the display device of FIG. 11.
Figure 14:
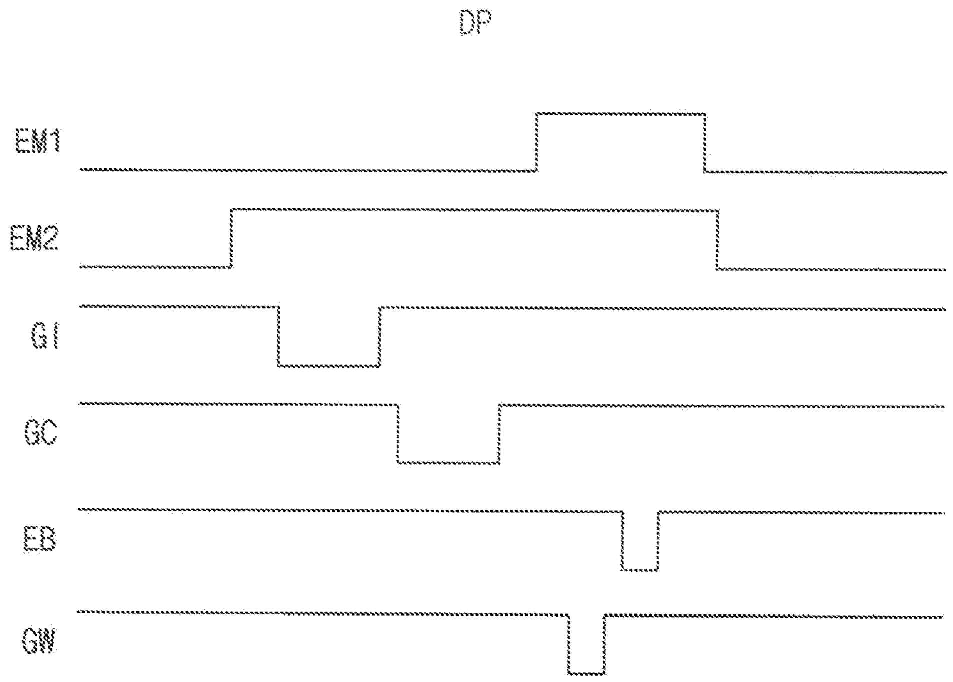
FIG. 14 is a timing diagram illustrating an example of signals in a driving period of the display device of FIG. 11.

FIG. 11 is a circuit diagram illustrating an example of the pixel circuit P' before the light emitting element EE of a display device according to one or more embodiments of the present disclosure is formed. FIG. 12 is a circuit diagram illustrating an example of the pixel circuit P of the display device of FIG. 11. FIG. 13 is a timing diagram illustrating an example of signals in the array test period AP of the display device of FIG. 11. FIG. 14 is a timing diagram illustrating an example of signals in the driving period DP of the display device of FIG. 11.

The display device according to the present embodiment may be the same or substantially the same as (or similar to) the display device 1000 of FIG. 1, except for the test transistor T10 may be different, and the second compensation transistor T5 may be omitted. Therefore, the same reference numerals are used to refer to the same or substantially the same (or similar) elements, and thus, redundant description thereof may not be repeated.

Referring to FIGS. 1 and 11 through 14, the pixel circuit P of the display device may include the light emitting element EE, the driving transistor T1 for generating the driving current, the write transistor T2, the first compensation transistor T3, the storage capacitor Cst, and a test transistor T10. The write transistor T2 may include a control electrode for receiving the write gate signal GW, the first electrode for receiving the data voltage VDATA, and the second electrode connected to the first electrode of the storage capacitor Cst. The first compensation transistor T3 may include the control electrode for receiving the compensation gate signal GC, the first electrode connected to the control electrode of the driving transistor T1, and the second electrode connected to the first electrode of the driving transistor T1. The storage capacitor Cst may include the first electrode connected to the second electrode of the write transistor T2, and the second electrode connected to the control electrode of the driving transistor T1. The test transistor T10 may include a control electrode, a first electrode connected between the write transistor T2 and the storage capacitor Cst for receiving the data voltage VDATA, and a second electrode connected to the second electrode of the driving transistor T1.

In an embodiment, the pixel circuit P may further include the first initialization transistor T4, the second initialization transistor T6, the first emission transistor T7, the second emission transistor T8, and the hold capacitor Chold. The first initialization transistor T4 may include the control electrode for receiving the initialization gate signal GI, the first electrode for receiving the first initialization voltage VINT, and the second electrode connected to the control electrode of the driving transistor T1. The second initialization transistor T6 may include the control electrode for receiving the bias signal EB, the first electrode for receiving the second initialization voltage VAINT, and the second electrode connected to the anode electrode of the light emitting element EE. The first emission transistor T7 may include the control electrode for receiving the first emission signal EM1, the first electrode connected to the second electrode of the driving transistor T1, and the second electrode for receiving the first power voltage ELVDD (e.g., the high power voltage). The second emission transistor T8 may include the control electrode for receiving the second emission signal EM2, the first electrode connected to the anode electrode of the light emitting element EE, and a second electrode connected to the first electrode of the driving transistor T1. The hold capacitor Chold may include the first electrode connected to the first electrode of the storage capacitor Cst, and the second electrode for receiving the first power voltage ELVDD.

In an embodiment, the pixel circuit P may include the bias transistor T9 including the control electrode for receiving the bias signal EB, the first electrode connected to the second electrode of the driving transistor T1, and the second electrode for receiving the bias voltage Vbias. The light emitting element EE may include the anode electrode connected to the first electrode of the second emission transistor T8, and the cathode electrode for receiving the second power voltage ELVSS (e.g., the low power voltage). As shown in FIGS. 11 and 12, the transistors may be implemented as PMOS transistors, but the present disclosure is not limited thereto.

In an embodiment, the first electrode of the test transistor T10 may be connected to the second electrode of the write transistor T2. The compensation gate signal GC may be applied to the control electrode of the test transistor T10.

For example, as shown in FIG. 13, as the initialization gate signal GI has the active level in the array test period AP, the first initialization voltage VINT may be applied to the control electrode of the driving transistor T1. As the compensation gate signal GC and the write gate signal GW concurrently (e.g., simultaneously) have the active level, and the first emission signal EM1 has the inactive level in the array test period AP, the current path flowing from the data line DL through the write transistor T2, the test transistor T10, the driving transistor T1, and the first compensation transistor T3 to the control electrode of the driving transistor T1 may be formed. Accordingly, the array test for the driving transistor T1 may be performed. The above description has been given according to a sequence of the timing diagram shown in FIG. 13.

In some embodiments, as shown in FIG. 14, as the initialization gate signal GI has the active level in the driving period DP for the display device 1000 to display an image, the first initialization voltage VINT may be applied to the control electrode of the driving transistor T1. As the compensation gate signal GC and the first emission signal EM1 have the active level in the driving period DP, the first power voltage ELVDD may be applied to the first electrode of the storage capacitor Cst, and the first power voltage ELVDD for which the threshold voltage of the driving transistor T1 is compensated for may be applied to the second electrode of the storage capacitor Cst (e.g., a voltage of the second electrode of the storage capacitor Cst may be ELVDD-VTH, where VTH is the threshold voltage of the driving transistor T1). As the write gate signal GW has the active level in the driving period DP, the data voltage VDATA may be applied to the first electrode of the storage capacitor Cst. Also, because the second electrode of the storage capacitor Cst is in the floating state, the voltage of the second electrode of the storage capacitor Cst may change by a difference between the data voltage VDATA and the first power voltage ELVDD (e.g., the voltage of the second electrode of the storage capacitor Cst may be ELVDD-VTH+VDATA-ELVDD.). As the bias signal EB has the active level in the driving period DP, the bias voltage Vbias may be applied to the second electrode of the driving transistor T1, and the second initialization voltage VAINT may be applied to the anode electrode of the light emitting element EE. Accordingly, the hysteresis characteristic of the driving transistor T1 may be restored, and the anode electrode of the light emitting element EE may be initialized. As the first emission signal EM1 and the second emission signal EM2 have the active level in the driving period DP, the first power voltage ELVDD may be applied to the second electrode of the driving transistor T1. Accordingly, the driving current proportional to a square of a source-gate voltage (e.g., ELVDD-VDATA) of the driving transistor T1 may be generated. The above description has been given according to a sequence of the timing diagram shown in FIG. 14.

Figure 15:
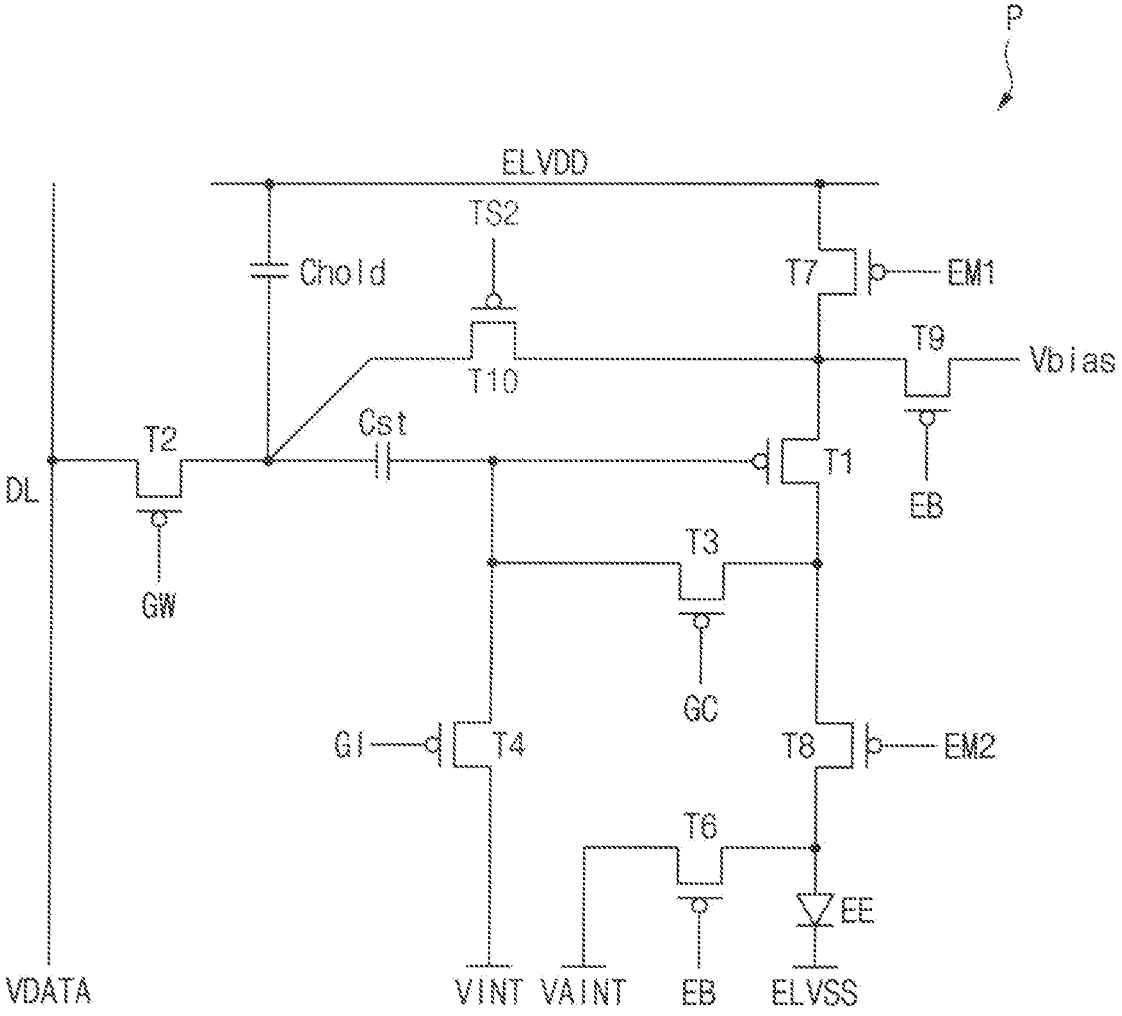
FIG. 15 is a circuit diagram illustrating a pixel circuit of a display device according to one or more embodiments of the present disclosure.
Figure 16:
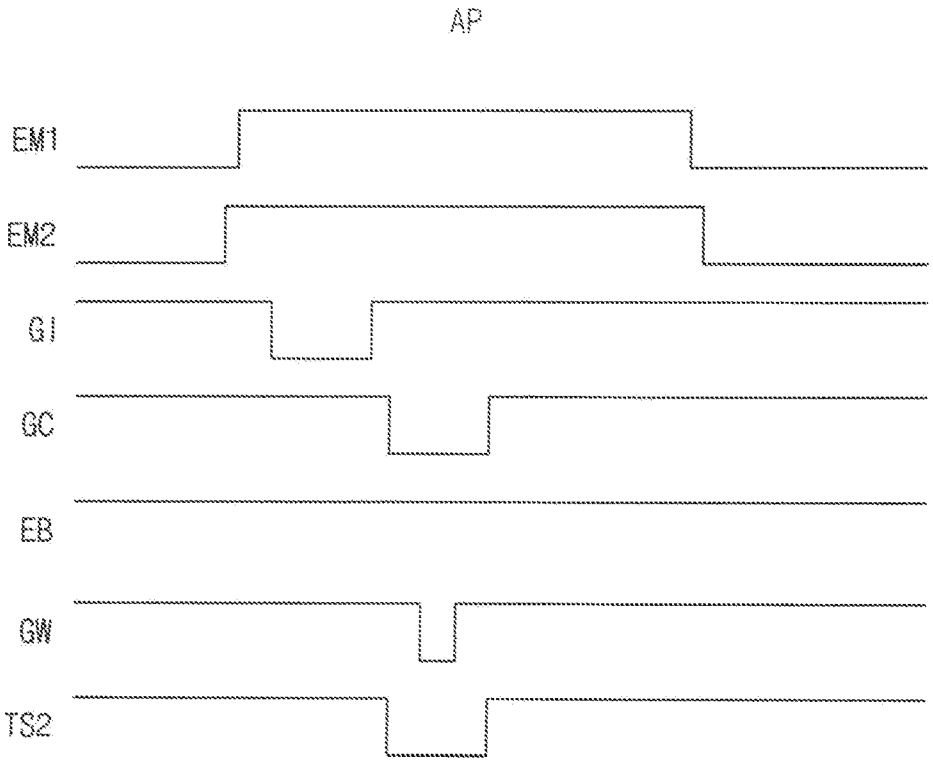
FIG. 16 is a timing diagram illustrating an example of signals in an array test period of the display device of FIG. 15.
Figure 17:
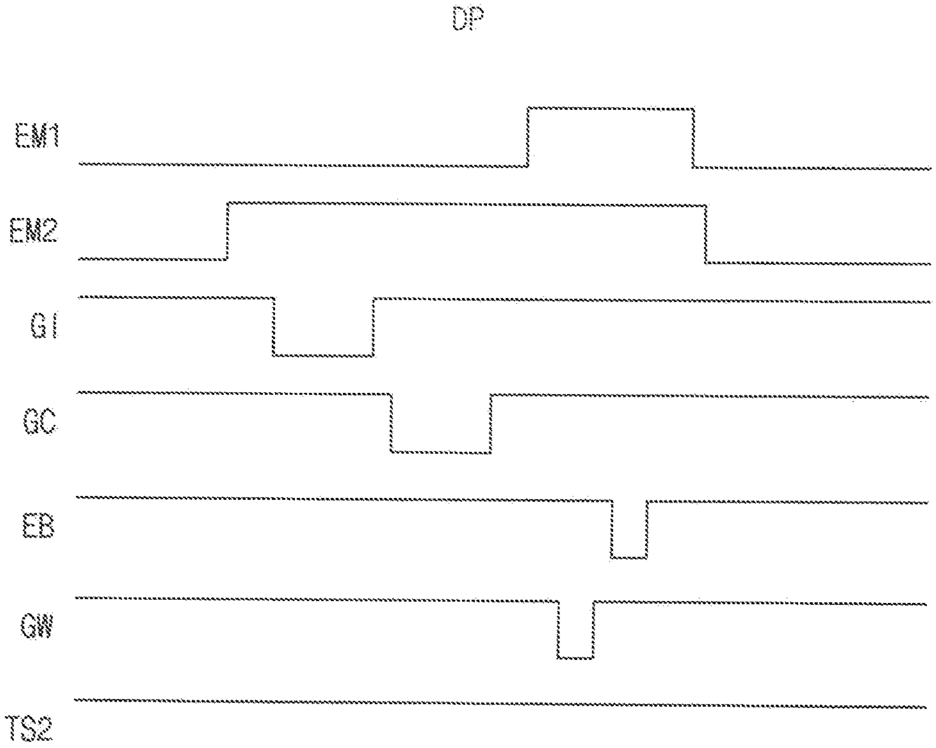
FIG. 17 is a timing diagram illustrating an example of signals in a driving period of the display device of FIG. 15.

FIG. 15 is a circuit diagram illustrating the pixel circuit P of a display device according to one or more embodiments of the present disclosure. FIG. 16 is a timing diagram illustrating an example of signals in the array test period AP of the display device of FIG. 15. FIG. 17 is a timing diagram illustrating an example of signals in the driving period DP of the display device of FIG. 15. FIGS. 16 and 17 illustrate the active level as the low voltage level and the inactive level as the high voltage level.

The display device according to the present embodiment may be the same or substantially the same as (or similar to) the display device of FIG. 11, except for a voltage applied to the control electrode of the test transistor T10 may be different. Therefore, the same reference numerals are used to refer to the same or substantially the same (or similar) elements, and thus, redundant description thereof may not be repeated.

Referring to FIGS. 1 and 15 through 17, a second test signal TS2 may be applied to the control electrode of the test transistor T10. The second test signal TS2 may have the same or substantially the same voltage level as that of the write gate signal GW in the array test period AP, and the second test signal TS2 may have the inactive level in the driving period DP. Accordingly, the display device of FIG. 15 may perform the array test in the same or substantially the same manner as that of the display device of FIG. 11 in the array test period AP. However, unlike the display device of FIG. 11, the display device of FIG. 15 may not apply the data voltage VDATA to the second electrode of the driving transistor T1 through the test transistor T10 in the driving period DP.

Figure 18:
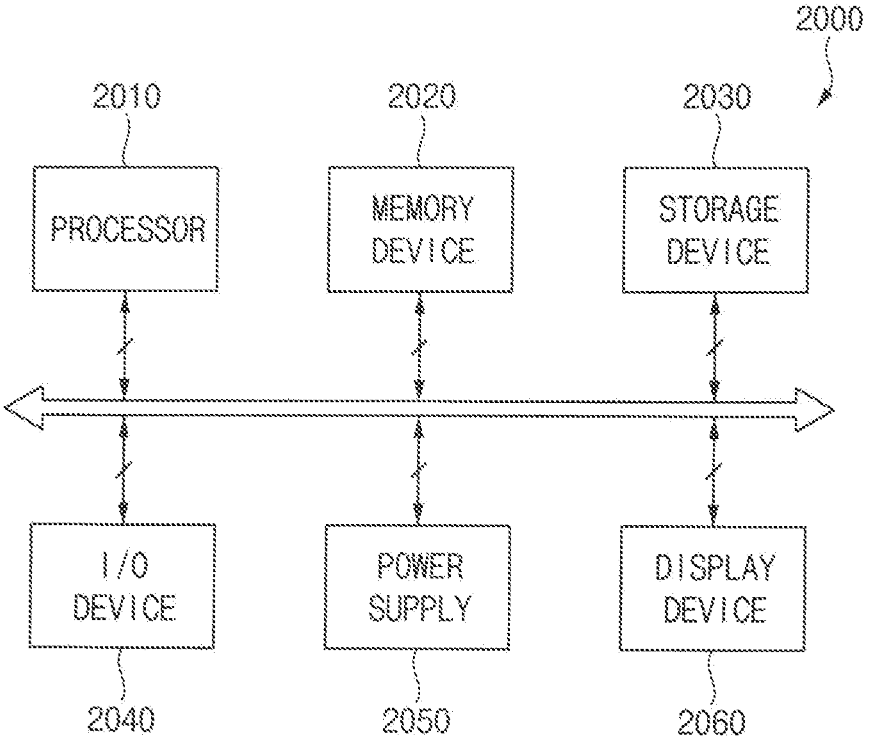
FIG. 18 is a block diagram illustrating an electronic device according to one or more embodiments.
Figure 19:
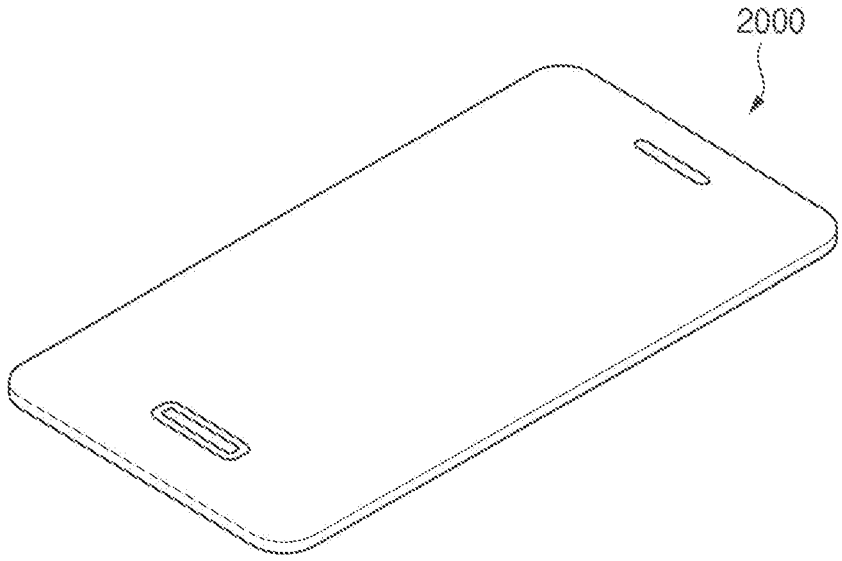
FIG. 19 is a diagram illustrating an example of the electronic device of FIG. 18 implemented as a smart phone.

FIG. 18 is a block diagram illustrating an electronic device according to one or more embodiments. FIG. 19 is a diagram illustrating an example of the electronic device of FIG. 18 implemented as a smart phone.

Referring to FIGS. 18 and 19, the electronic device 2000 may include a processor 2010, a memory device 2020, a storage device 2030, an input/output (I/O) device 2040, a power supply 2050, and a display device 2060. Here, the display device 2060 may be any of the display devices according to the embodiments described above, for example, such as the display device 1000 of FIG. 1. In addition, the electronic device 2000 may further include a plurality of ports for communicating with a video card, a sound card, a memory card, a universal serial bus (USB) device, other electronic devices, and/or the like. In an embodiment, as shown in FIG. 19, the electronic device 2000 may be implemented as a smart phone 2000. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, or the like.

The processor 2010 may perform various computing functions. The processor 2010 may be a micro-processor, a central processing unit (CPU), an application processor (AP), and/or the like. The processor 2010 may be coupled to other components via an address bus, a control bus, a data bus, and the like. Further, the processor 2010 may be coupled to an extended bus, such as a peripheral component interconnection (PCI) bus.

The memory device 2020 may store data for various operations of the electronic device 2000. For example, the memory device 2020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like, and/or may include at least one volatile memory device, such as a dynamic random access memory (DRAM) device, a static random access memory (SRAM) device, a mobile DRAM device, and the like.

The storage device 2030 may include a solid state drive (SSD) device, a hard disk drive (HDD) device, a CD-ROM device, and/or the like.

The I/O device 2040 may include an input device, such as a keyboard, a keypad, a mouse device, a touch pad, a touch screen, and/or the like, and an output device, such as a printer, a speaker, and/or the like. In some embodiments, the I/O device 2040 may include the display device 2060.

The power supply 2050 may provide power for various operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but the present disclosure is not limited thereto. The display device 2060 may be coupled to other components via the buses or other communication links. Here, the display device 2060 may include the test transistor for performing the array test, and a current path flowing through the driving transistor and the test transistor to which the data voltage is applied may be formed. Accordingly, the array test for the driving transistor may be performed.

One or more embodiments of the present disclosure may be applied to any suitable electronic device including the display device. For example, one or more embodiments of the present disclosure may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, and the like.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A pixel circuit comprising:

a light emitting element;

a driving transistor configured to generate a driving current;

a write transistor including a control electrode configured to receive a write gate signal, a first electrode connected to a data line and configured to receive a data voltage, and a second electrode connected to a first electrode of a storage capacitor;

a first compensation transistor including a control electrode configured to receive a compensation gate signal, a first electrode connected to a control electrode of the driving transistor, and a second electrode connected to a first electrode of the driving transistor;

the storage capacitor including the first electrode connected to the second electrode of the write transistor, and a second electrode connected to the control electrode of the driving transistor; and a test transistor including a control electrode, a first electrode configured to receive the data voltage, and a second electrode connected to a second electrode of the driving transistor, wherein, in at least an array test period, the test transistor is configured to be turned on concurrently with the write transistor to apply the data voltage to the second electrode of the driving transistor while the write transistor is turned on to connect the first electrode of the storage capacitor to the data line.

2. The pixel circuit of claim 1, wherein the test transistor is configured to be in an on-state with the first compensation transistor in the array test period, and not be in the on-state with the first compensation transistor in a driving period.

3. The pixel circuit of claim 1, wherein the first electrode of the test transistor is connected to the data line configured to be applied with the data voltage.

4. The pixel circuit of claim 3, wherein the control electrode of the test transistor is configured to receive the write gate signal.

5. The pixel circuit of claim 4, further comprising:

a second compensation transistor including a control electrode configured to receive the compensation gate signal, a first electrode, and a second electrode connected to the first electrode of the storage capacitor, wherein the first electrode of the second compensation transistor is configured to be in a floating state in the array test period, and wherein the first electrode of the second compensation transistor is configured to receive a reference voltage in a driving period.

6. The pixel circuit of claim 4, further comprising:

a second compensation transistor including a control electrode configured to receive the compensation gate signal, a first electrode, and a second electrode connected to the first electrode of the storage capacitor, wherein the first electrode of the second compensation transistor is configured to receive the data voltage in the array test period, and wherein the first electrode of the second compensation transistor is configured to receive a reference voltage in a driving period.

7. The pixel circuit of claim 3, wherein the control electrode of the test transistor is configured to receive a first test signal, wherein the first test signal has the same voltage level as that of the write gate signal in the array test period, and wherein the first test signal has an inactive level in a driving period.

8. A pixel circuit comprising:

a light emitting element;

a driving transistor configured to generate a driving current;

a write transistor including a control electrode configured to receive a write gate signal, a first electrode configured to receive a data voltage, and a second electrode connected to a first electrode of a storage capacitor;

a first compensation transistor including a control electrode configured to receive a compensation gate signal, a first electrode connected to a control electrode of the driving transistor, and a second electrode connected to a first electrode of the driving transistor;

the storage capacitor including the first electrode connected to the second electrode of the write transistor, and a second electrode connected to the control electrode of the driving transistor;

a test transistor including a control electrode, a first electrode configured to receive the data voltage, and a second electrode connected to a second electrode of the driving transistor;

a first initialization transistor including a control electrode configured to receive an initialization gate signal, a first electrode configured to receive a first initialization voltage, and a second electrode connected to the control electrode of the driving transistor;

a second compensation transistor including a control electrode configured to receive the compensation gate signal, a first electrode, and a second electrode connected to the first electrode of the storage capacitor;

a second initialization transistor including a control electrode configured to receive a bias signal, a first electrode configured to receive a second initialization voltage, and a second electrode connected to an anode electrode of the light emitting element;

a first emission transistor including a control electrode configured to receive a first emission signal, a first electrode connected to the second electrode of the driving transistor, and a second electrode configured to receive a first power voltage;

a second emission transistor including a control electrode configured to receive a second emission signal, a first electrode connected to the anode electrode of the light emitting element, and a second electrode connected to the first electrode of the driving transistor; and a hold capacitor including a first electrode connected to the first electrode of the storage capacitor, and a second electrode configured to receive the first power voltage.

9. The pixel circuit of claim 8, further comprising:

a bias transistor including a control electrode configured to receive the bias signal, a first electrode connected to the second electrode of the driving transistor, and a second electrode configured to receive a bias voltage.

10. The pixel circuit of claim 9, wherein the bias signal has an inactive level in an array test period.

11. The pixel circuit of claim 1, wherein the first electrode of the test transistor is connected to the second electrode of the write transistor.

12. The pixel circuit of claim 11, wherein the control electrode of the test transistor is configured to receive the compensation gate signal.

13. The pixel circuit of claim 12, further comprising:

a first initialization transistor including a control electrode configured to receive an initialization gate signal, a first electrode configured to receive a first initialization voltage, and a second electrode connected to the control electrode of the driving transistor;

a second initialization transistor including a control electrode configured to receive a bias signal, a first electrode configured to receive a second initialization voltage, and a second electrode connected to an anode electrode of the light emitting element;

a first emission transistor including a control electrode configured to receive a first emission signal, a first electrode connected to the second electrode of the driving transistor, and a second electrode configured to receive a first power voltage;

a second emission transistor including a control electrode configured to receive a second emission signal, a first electrode connected to the anode electrode of the light emitting element, and a second electrode connected to the first electrode of the driving transistor;

a hold capacitor including a first electrode connected to the first electrode of the storage capacitor, and a second electrode configured to receive the first power voltage; and a bias transistor including a control electrode configured to receive the bias signal, a first electrode connected to the second electrode of the driving transistor, and a second electrode configured to receive a bias voltage.

14. The pixel circuit of claim 11, wherein the control electrode of the test transistor is configured to receive a second test signal, wherein the second test signal has the same voltage level as that of the compensation gate signal in the array test period, and wherein the second test signal has an inactive level in a driving period.

15. A display device comprising:

a display panel comprising pixel circuits; and a display panel driver configured to drive the display panel, wherein each of the pixel circuits comprises:

a light emitting element;

a driving transistor configured to generate a driving current;

a write transistor including a control electrode configured to receive a write gate signal, a first electrode connected to a data line and configured to receive a data voltage, and a second electrode connected to a first electrode of a storage capacitor;

a first compensation transistor including a control electrode configured to receive a compensation gate signal, a first electrode connected to a control electrode of the driving transistor, and a second electrode connected to a first electrode of the driving transistor;

the storage capacitor including the first electrode connected to the second electrode of the write transistor, and a second electrode connected to the control electrode of the driving transistor;

a test transistor including a control electrode, a first electrode configured to receive the data voltage, and a second electrode connected to a second electrode of the driving transistor; and a hold capacitor including a first electrode connected to the first electrode of the storage capacitor, and a second electrode configured to receive a first power voltage, wherein, in at least an array test period, the test transistor is configured to be turned on concurrently with the write transistor to apply the data voltage to the second electrode of the driving transistor while the write transistor is turned on to connect the first electrode of the storage capacitor to the data line.

16. The display device of claim 15, wherein the test transistor is configured to be in an on-state with the first compensation transistor in the array test period, and not be in the on-state with the first compensation transistor in a driving period.

17. The display device of claim 15, wherein the first electrode of the test transistor is connected to the data line configured to be applied with the data voltage.

18. The display device of claim 17, wherein the control electrode of the test transistor is configured to receive the write gate signal.

19. The display device of claim 15, wherein the first electrode of the test transistor is connected to the second electrode of the write transistor.

20. The display device of claim 19, wherein the control electrode of the test transistor is configured to receive the compensation gate signal.

* * * * *